UNITED STATES PATENT OFFICE.

ALDEN SOLMANS, OF SOUTH NORWALK, CONNECTICUT.

COMPOUND FOR STIFFENING HATS.

SPECIFICATION forming part of Letters Patent No. 287,972, dated November 6, 1883.

Application filed August 21, 1883. (No specimens.)

*To all whom it may concern:*

Be it known that I, ALDEN SOLMANS, a citizen of the United States, residing at South Norwalk, in the county of Fairfield and State of Connecticut, have invented a new and useful Compound for Stiffening Hats; and I do hereby declare the following to be a full, clear, and exact description of the invention, such as will enable others skilled in the art to which it appertains to make and use the same.

My invention relates to the manufacture of hats; and it has for its object to produce a hat-stiffening compound which shall be equal to the best now in use, but shall be trifling in cost compared therewith.

With these ends in view my compound consists of the following ingredients, combined in substantially the proportions specified, viz: pine gum, five parts; shellac, five parts; sandarac, two parts, these gums to be dissolved in an alkali solution.

I do not desire to limit myself to the exact quantities specified above, as they may be varied within reasonable limits without essentially changing the character of the composition. Where an exceedingly stiff compound is desired, the quantity of sandarac (which is the hardest of the gums) may be increased.

Any alkali solution may be used as a solvent—for instance, sal-soda, (carbonate of soda,) borax, (borate of soda,) hydrochlorate (muriate) of ammonia, or ordinary spirits of ammonia. Borax, however, I deem preferable to any of the others, and therefore ordinarily use borax dissolved in water as a solvent for the gums. Heretofore in all compounds for stiffening hats the gums have been "cut" or dissolved in alcohol. This, however, makes an expensive compound, and it has been my object to discover a less expensive compound which would accomplish equally good results. After numerous experiments I have discovered that with the ingredients combined in the proportions specified above and dissolved in an alkali solution, I can equal the finest "wine-stiff," and at very much less expense. I also use my compound for "squaring up," which is the final application of stiffening compound to the inside of the hats.

Having thus described my invention, what I claim as new is—

1. The herein-described compound for stiffening hats, consisting of pine gum, shellac, and sandarac, in substantially the proportions specified, dissolved in an alkali solution.

2. The herein-described compound for stiffening hats, consisting of pine gum, shellac, and sandarac, in substantially the proportions specified, dissolved in a solution of borax.

In testimony whereof I affix my signature in presence of two witnesses.

ALDEN SOLMANS.

Witnesses:
   A. M. WOOSTER,
   S. S. WILLIAMSON.